United States Patent
Li et al.

(10) Patent No.: US 8,254,359 B2
(45) Date of Patent: *Aug. 28, 2012

(54) RECURSIVE REDUCTION OF CHANNEL STATE FEEDBACK

(75) Inventors: Qinghua Li, Sunnyvale, CA (US);
Xintian E. Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 1081 days.

This patent is subject to a terminal disclaimer.

(21) Appl. No.: 12/004,923

(22) Filed: Dec. 21, 2007

(65) Prior Publication Data

US 2009/0161646 A1    Jun. 25, 2009

(51) Int. Cl.
*H04B 7/216* (2006.01)

(52) U.S. Cl. ........................................................ 370/342

(58) Field of Classification Search .................. 370/342, 370/536

See application file for complete search history.

(56) References Cited

U.S. PATENT DOCUMENTS

| | | | |
|---|---|---|---|
| 7,362,822 B2* | 4/2008 | Li et al. ........................ | 375/299 |
| 7,916,081 B2* | 3/2011 | Lakkis ......................... | 342/367 |
| 2006/0056531 A1* | 3/2006 | Li et al. ........................ | 375/267 |
| 2006/0092054 A1* | 5/2006 | Li et al. ........................ | 341/67 |
| 2006/0234645 A1* | 10/2006 | Lin et al. ....................... | 455/69 |
| 2007/0297529 A1* | 12/2007 | Zhou et al. .................... | 375/267 |
| 2009/0046807 A1* | 2/2009 | Xia et al. ...................... | 375/299 |

FOREIGN PATENT DOCUMENTS

| WO | WO-2005125044 A1 | 12/2005 |
|---|---|---|
| WO | WO-2006031485 A1 | 3/2006 |

OTHER PUBLICATIONS

Love et al. "Grassmannian Beamforming for Multiple Input Multiple Output Wireless Systems". IEEE Transactions on Information Theory, vol. 49, No. 10, Oct. 2003.*

"International Search Report/Written Opinion received for PCT Application No. PCT/US2008/084578 mailed on Mar. 25, 2009", 11 pages.

Office Action received in JP 2010-539580 on Dec. 26, 2011, 4 pages.

* cited by examiner

*Primary Examiner* — Derrick Ferris
*Assistant Examiner* — Saad A Waqas
(74) *Attorney, Agent, or Firm* — Cool Patent, P.C.; Kenneth J. Cool; Joseph P. Curtin

(57) ABSTRACT

A method and a system that multiplies a beamforming matrix by a unitary matrix that does not change the subspace of the beamforming matrix for form a converted matrix having a lower left triangle of zeros. A first column vector having a fewest number of elements of the converted matrix is quantized using a codebook and represented by a first codebook index. A Householder matrix is determined from the quantized first column vector and the converted matrix is multiplied by the Householder matrix. Quantizing, determining a Householder matrix from further column vectors of the converted matrix using a codebook and representing each respective column vector by further corresponding codebook index, and multiplying the converted matrix on the left by the determined Householder matrix for each respective column vector are recursively repeated. The first codebook index and further codebook indices are transmitted to a remote station for use in beamforming.

6 Claims, 5 Drawing Sheets

RECURSIVE REDUCTION OF CHANNEL STATE FEEDBACK

FIELD

The present invention relates generally to wireless networks, and more specifically to wireless networks that utilize multiple spatial channels.

BACKGROUND

Closed-loop multiple-input-multiple-output (MIMO) systems typically transmit channel state information from a receiver to a transmitter. Transmitting the channel state information consumes bandwidth that might otherwise be available for data traffic.

DESCRIPTION OF EMBODIMENTS

Figure 1:
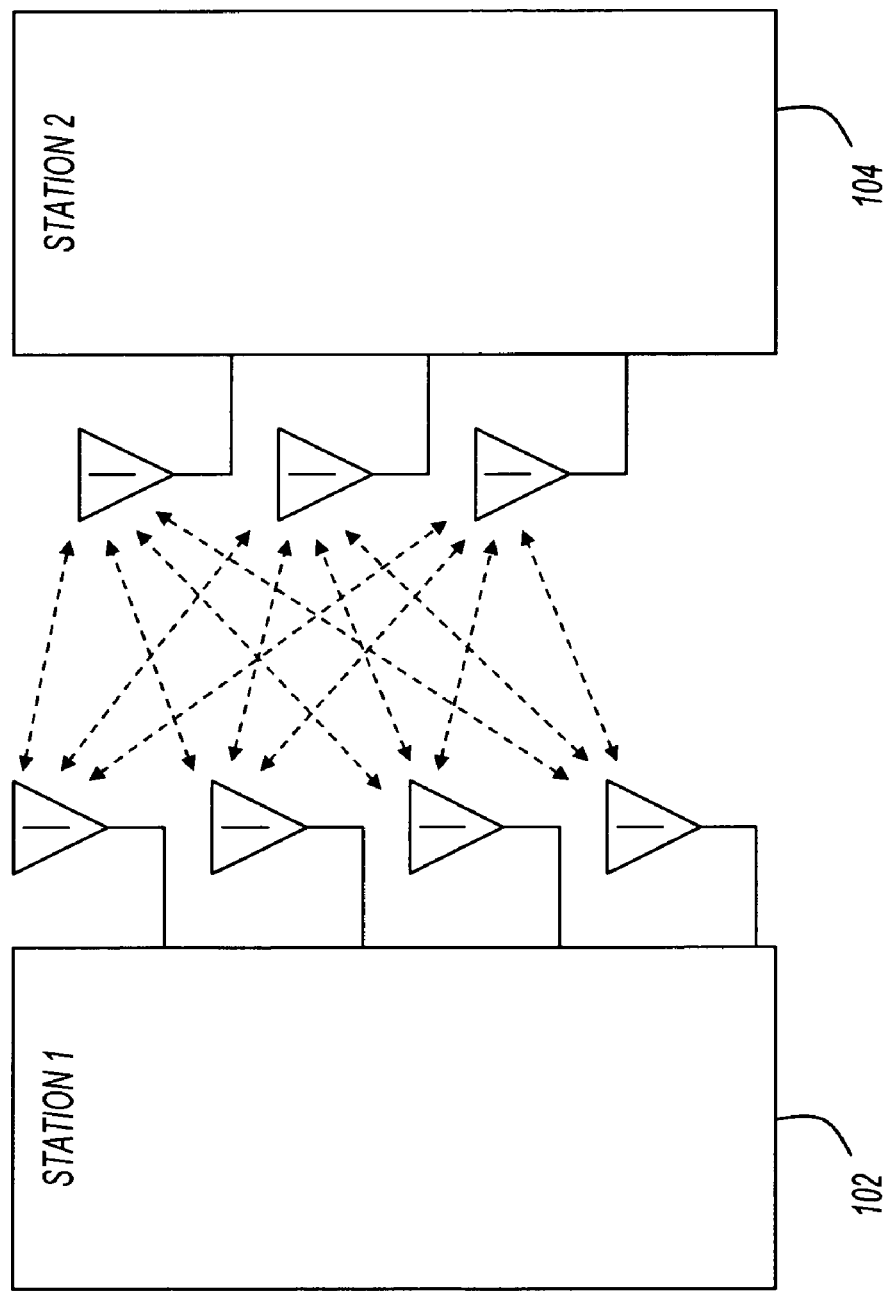
FIG. 1 shows a diagram of two wireless stations.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of two wireless stations: station 102, and station 104. In some embodiments, stations 102 and 104 are part of a wireless local area network (WLAN). For example, one or more of stations 102 and 104 may be an access point in a WLAN. Also for example, one or more of stations 102 and 104 may be a mobile station, such as a laptop computer, personal digital assistant (PDA), or the like. Further, in some embodiments, stations 102 and 104 are part of a wireless wide area network (WWAN) or wireless metropolitan area network (WMAN). For example, one or more of stations 102 and 104 may be a base station or a subscriber unit. Although only two stations are shown in FIG. 1, any number of stations may be present without departing from the scope of the present invention.

In some embodiments, stations 102 and 104 may operate partially in compliance with, or completely in compliance with, a wireless network standard. For example, stations 102 and 104 may operate partially in compliance with a WLAN standard such as IEEE Std. 802.11, 1999 Edition, although this is not a limitation of the present invention. As used herein, the term "802.11" refers to any past, present, or future IEEE 802.11 standard, including, but not limited to, the 1999 edition. Also for example, stations 102 and 104 may operate partially in compliance with a WMAN standard such as IEEE Std. 802.16-2004, although this is not a limitation of the present invention. As used herein, the term "802.16" refers to any past, present, or future IEEE 802.16 standard, including, but not limited to, the 2004 edition. Also for example, stations 102 and 104 may operate partially in compliance with any other standard, such as any future IEEE personal area network standard or wide area network standard.

Stations 102 and 104 may include any number of antennas. In the example of FIG. 1, station 102 includes four antennas, and station 104 includes three antennas. The "channel" through which stations 102 and 104 communicate may include many possible signal paths. For example, when stations 102 and 104 are in an environment with many "reflectors" (e.g. walls, doors, or other obstructions), many signals may arrive from different paths. This condition is known as "multipath." In some embodiments, stations 102 and 104 utilize multiple antennas to take advantage of the multipath and to increase the communications bandwidth. For example, in some embodiments, stations 102 and 104 may communicate using Multiple-Input-Multiple-Output (MIMO) techniques. In general, MIMO systems offer higher capacities by utilizing multiple spatial channels made possible by multipath. The channel between stations 102 and 104 is described by the channel state matrix, H, that includes entries describing the complex channel gains between each transmit and receive antenna pair.

In some embodiments, stations 102 and 104 may communicate using orthogonal frequency division multiplexing (OFDM) in each spatial channel. Multipath may introduce frequency selective fading which may cause impairments like inter-symbol interference (ISI). OFDM is effective at combating frequency selective fading in part because OFDM breaks each spatial channel into small subchannels such that each subchannel exhibits a more flat channel characteristic. Scaling appropriate for each subchannel may be implemented to correct any attenuation caused by the subchannel. Further, the data carrying capacity of each subchannel may be controlled dynamically depending on the fading characteristics of the subchannel.

MIMO systems may operate either "open loop" or "closed loop." In open-loop MIMO systems, no channel state information is explicitly fed back from another station. In closed-loop systems, communications bandwidth is utilized to transmit channel state information between stations, and thereby reducing overall throughput. The channel state information can be employed for various enhancements, such as transmit beamforming and adaptive modulation. The communications bandwidth used for this purpose is referred to herein as "feedback bandwidth." When feedback bandwidth is reduced in closed-loop MIMO systems, more bandwidth is available for data communications.

Various embodiments of the present invention provide for closed loop MIMO with a compact feedback scheme, thereby saving feedback bandwidth. In some embodiments, feedback bandwidth is saved by feeding back transmit beamforming vectors instead of the channel matrix H. Further, in some embodiments, the elements of each beamforming vector are jointly quantized by vector quantization using codebooks. In some embodiments, beamforming vectors are only fed back for the active spatial channels. This provides a significant overhead reduction in the case of spatial channel puncture, in which the spatial channel corresponding to the weakest eigenmode is usually punctured. Additionally, in some embodiments the mean (and variance) of eigenvalues for each active spatial channel is fed back for adaptive modulation, in which the mean (and variance) is computed over the sorted eigenvalues on OFDM subchannels. For example, each OFDM subchannel has two active spatial channels that correspond to two eigenvalues. The two eigenvalues are sorted for each subchannel. The mean (and variance) of the first sorted eigenvalues is computed over the subchannels and is fed back. Similarly, the mean (and variance) of the second sorted eigenvalues does so.

The various embodiments of the present invention provide a systematic, uniform scheme supporting all antenna configurations such as 2×2, 4×2, 4×4 and beyond, and one codebook (or set of codebooks) may be shared among the various antenna configurations. Further, the reconstructed matrix is unitary without additional correction. Unitary matrix has unit norm on each column and all the columns are orthogonal each other. In addition, unitary matrix can be either square or non-square.

A transmit beamforming matrix may be found using singular value decomposition (SVD) of the channel state matrix H as follows:

$$H_{m \times n} = U_{m \times m} D_{m \times n} V'_{n \times n} \quad (1)$$

$$x_{n \times 1} = V_{n \times n} d_{n \times 1} \quad (2)$$

in which d is the n-vector of data symbols containing k non-zero elements, in which k is the number of active spatial channels (see next paragraph); x is the beamformed, transmitted signal vector on n transmit antennas; H is the channel matrix; H's singular value decomposition is H=UDV'; U and V are unitary; D is a diagonal matrix with H's eigenvalues; V is n by n and only the first k columns are needed to be fed back. Equation (2) is the beamforming act at the transmitter after the beamforming matrix V is fed back from the receiver to the transmitter.

Various embodiments of the present invention combine Householder reflection techniques with vector quantization in the quantization of V, the unitary beamforming matrix. First, the beamforming matrix V is converted to a matrix with a lower left triangle of zeros. This can be accomplished by multiplying V with M, a unitary matrix that does not change the subspace. Then, the first n−k+1 entries of the first column of VM are quantized by a (n−k+1) by 1 vector codebook, in which k is the number of spatial streams. A Householder matrix, Q, is then constructed from the quantized vector, and VM is decomposed into two matrices: one specified by Q, and a remainder matrix $V_1$ having a vertical dimension reduced by one and having a lower left triangle of zeros. The process is then repeated k−1 times to quantize successive columns in $V_1$. As a result, the quantization of V is converted to the quantization of k unit vectors of dimension n−k+1. Since each of the k unit vectors is of the same dimension, a common codebook may be utilized for each, thereby saving codebook storage resources at the transmitter and receiver.

In some embodiments, an access point may send training signals to a station and the station may compute and feedback the beamforming matrix V in (1). If the station knows beforehand that the access point only employs k spatial streams, the station may only feed back the first k columns of the V matrix, which corresponds to the k strongest eigenmodes of H. This offers an additional reduction in feedback bandwidth. The degree of freedom of H is $2n^2$ while the degree of freedom of V is $n^2-n$ for m=n. Since only V is useful for transmit beam-forming and V contains less information than H, feeding back V is more efficient than feeding back H.

Various receivers may use minimum mean squared error (MMSE) techniques or maximum likelihood detection (MLD) to characterize the channel. For example, for MMSE systems, beamforming matrices are unitary and the quantization codebook comprises a set of unitary matrixes. Each beamforming matrix is a point on the so-called "Stiefel manifold.". On the other hand, for ML systems, it is sufficient to quantize the subspace of the beamforming matrix. All the k dimensional subspaces of an n dimensional vector space forms a Grassmann manifold.

If the transmitter uses uniform power loading across spatial streams and the receiver uses a MLD receiver, the ideal beamforming matrix can be $V_{n \times k} M_{k \times k}$, in which $M_{k \times k}$ can be any k×k unitary matrix. This significantly reduces the number of codewords because all Vs in the same subspace can be quantized by the one codeword. Various embodiments of the present invention provide codebooks with codewords distributed uniformly over the Grassmann manifold. The new codebook results in more bit efficient quantization and more uniformly distributed codewords than those of previous systems.

Quantization of the beamforming matrix V is illustrated below by an example, in which 4 transmit antennas exist and 3 receive antennas exist. Although the example employs a 4×3 system, the various embodiments of the invention are not so limited. The receiver receives training symbols and computes the beamforming matrix, V as shown above in equation (1). Next, the receiver only needs to quantize the first 3 columns of V since the channel supports at most three modes. If the receiver knows the transmitter only employs two spatial channels, the receiver may only quantize the first two columns of V in the scheme depicted next.

In some embodiments, the V matrix is converted to a matrix having a lower left triangle of zeros, and is then quantized column by column and recursively. After the quantization of each column, the size of the problem is reduced by one on the column dimension. Denoting the beamforming matrix as:

$$V = \begin{bmatrix} v_{11} & v_{12} & v_{13} \\ v_{21} & v_{22} & v_{23} \\ v_{31} & v_{32} & v_{33} \\ v_{41} & v_{42} & v_{43} \end{bmatrix}, \quad (3)$$

A beamforming matrix with a lower left triangle of zeros can be generated as:

$$VM = \begin{bmatrix} \hat{v}_{11} & \hat{v}_{12} & \hat{v}_{13} \\ \hat{v}_{21} & \hat{v}_{22} & \hat{v}_{23} \\ 0 & \hat{v}_{32} & \hat{v}_{33} \\ 0 & 0 & \hat{v}_{43} \end{bmatrix}, \quad (4)$$

by multiplying V with M, a k by k unitary matrix.

The two elements of the first column of VM denoted as $\hat{v}_1$ may be quantized as follows.

$$v(l_1) = \arg\max_{u \in C_1} \|u^H \hat{v}_1\| \quad (5)$$

in which $C_1$ is a codebook containing unit 2-vectors for quantization, and in which $v(l_1)$ is the quantized vector corresponding to codebook index $l_1$. $v(l_1)$ has the maximum inner product among all unit vectors in the codebook. The codebook is constructed such that the codeword vectors distribute on the n-dimension complex unit sphere as uniformly as possible for one shot feedback and center around $e_1=[1\ 0\ \ldots\ 0]^T$ for differential feedback. Additionally, the first element of each codeword is set to be real for the next step.

A Householder reflection matrix is constructed as follows $$Q_1 = \begin{cases} I - \dfrac{2}{\|w_1 w_1^H\|} w_1 w_1^H, & w_1 \neq v(l_1) \\ I, & w_1 = v(l_1), \end{cases} \quad (6)$$

with $w_1=v(l_1)-e_1$ and $e_1=[1\ 0\ 0\ 0]^T$. An n by n unitary matrix $\tilde{Q}_1$ is formed by expanding $Q_1$ with two diagonal ones as shown in equation (7).

If $v(l_1)=\hat{v}_1$, Householder matrix converts the first column and row of VM into $[e^{j\phi_1}\ 0\ 0\ 0]^T$ and $e^{j\phi_1}[1\ 0\ 0]$ as shown in equation (7), in which $\phi_1$ is the phase of $\hat{v}_{11}$. Since usually $v(l_1) \approx \hat{v}_1$, there will be non-zero residuals in the off diagonal entries of the first column and row. After Householder reflection, equation (4) can be expressed as:

$$\underbrace{\begin{bmatrix} Q_1 & & \\ & 1 & \\ & & 1 \end{bmatrix}}_{\tilde{Q}_1} VM = \begin{bmatrix} e^{j\phi_1} & 0.0 & 0.0 \\ 0.0 & \tilde{v}_{11} & \tilde{v}_{12} \\ 0.0 & \tilde{v}_{21} & \tilde{v}_{22} \\ 0.0 & 0 & \tilde{v}_{32} \end{bmatrix} \quad (7)$$

From equation (7), we see that the size of $V_2$ is 3×2 and that the non-zero entries in the first column of $V_2$ form a unit vector with the same dimension as the previously quantized vector in VM. Recursively, we repeat the actions in equations (5), (6), and (7) on $V_2$ as follows. First, we quantize the unit 2-vector in the first column of $V_2$, using the same (or different) codebook of unit 2-vectors. The vector is quantized as $v(l_2)$, where $l_2$ is the codebook index. Then, we construct a Householder reflection matrix $Q_2$, and decompose $V_2$ as follows.

$$V_2 = \begin{bmatrix} Q_2 & & 0 \\ & & 0 \\ 0 & 0 & 1 \end{bmatrix} \begin{bmatrix} e^{j\phi_2} & 0.0 \\ 0.0 & \tilde{v}_{11} \\ 0.0 & \tilde{v}_{21} \end{bmatrix} \quad (8)$$

Finally, we quantize the vector $v_3$ using the same (or different) codebook of unit 2-vectors. The quantization indexes $l_1$, $l_2$, and $l_3$ are fed back to the access point, i.e., the transmitter, for beamforming. It is worth noting that the phases $\phi_i$ may not be sent back.

The various embodiments of the present invention provide a quantization scheme in which no two codewords are assigned to the same subspace. If V is decomposed into $l_1$, $l_2$, and $l_3$ as above, it can be shown that $v(l_1)$, $v(l_2)$, and $v(l_3)$ are uniformly distributed (if V is uniformly distributed). Therefore, the uniform vector codebook results in uniform matrix codebook.

The column-by-column quantization is shown more generally in equation (9) below. The beamforming matrix V is first converted to a matrix with a lower left triangle of zeros. The conversion can be done by multiplying a k×k unitary matrix on the right, which does not change the subspace. The k×k unitary matrix can be a product of a series of Householder reflection (or Givens rotation) matrixes. The first n−k+1 entries of the first column form a unit vector and the unit vector is quantized by a vector codebook. A Householder matrix $Q_1$ is then computed from the quantized unit vector as the first term on the left as in (7) with $v(l_i)$ equal to the quantized vector. $Q_1$ is then expanded to $\tilde{Q}_1$ as $$\tilde{Q}_1 = \begin{bmatrix} Q_1 & & \\ & 1 & \\ & & 1 \end{bmatrix}$$

by placing k−1 ones on the diagonal below $Q_1$. $\tilde{Q}_1$ is multiplied on left at (4) and the resultant matrix has zeros in the first column except the first element. The quantization recursively applies to the second column and the rest. The n−k+1 entries in the second column starting from the second entry forms a vector and the vector quantized by a vector codebook. A Householder matrix $Q_2$ is computed from the quantized vector and expanded to a n by n unitary matrix $\tilde{Q}_2$ as $$\tilde{Q}_2 = \begin{bmatrix} 1 & & \\ & Q_2 & \\ & & 1 \end{bmatrix}$$

by placing a diagonal one above $Q_2$ and k−2 diagonal ones below $Q_2$. In general, $\tilde{Q}_1$ is expanded from $Q_i$ by placing i−1 diagonal ones above $Q_i$ and k−i diagonal ones below $Q_i$. The diagonal ones in $\tilde{Q}_i$ has a property. If the diagonal ones are on rows $i_1, \ldots, i_{k-1}$, then rows $i_1, \ldots, i_1, \ldots, i_{k-1}$ of A remain the same after the multiplication $\tilde{Q}_i A$. This property can be exploited to reduce computational complexities since only subsets of the matrixes are involved in the multiplications in equation (9).

$$V \xrightarrow{VM} \begin{bmatrix} v_{1,1}(1) & \cdots & \cdots & v_{1,k}(1) \\ \vdots & & & \vdots \\ \vdots & & & \vdots \\ v_{n-k+1,1}(1) & & & \vdots \\ 0 & \ddots & & \vdots \\ \vdots & & \ddots & \vdots \\ 0 & \cdots & 0 & v_{n,k}(1) \end{bmatrix} \xrightarrow{\tilde{Q}_1 VM} \quad (9)$$

$$\begin{bmatrix} e^{j\phi_1} & 0 & \cdots & 0 \\ 0 & v_{2,2}(2) & \cdots & v_{2,k}(2) \\ \vdots & \vdots & & \vdots \\ 0 & \vdots & & \vdots \\ 0 & v_{n-k+2,2}(2) & \ddots & \vdots \\ 0 & \cdots & 0 & v_{n,k}(2) \end{bmatrix} \xrightarrow{\tilde{Q}_2 \tilde{Q}_1 VM} \begin{bmatrix} e^{j\phi_1} & & & \\ & e^{j\phi_2} & & \\ & & \ddots & \\ & & & e^{j\phi_k} \end{bmatrix}$$

Figure 2:
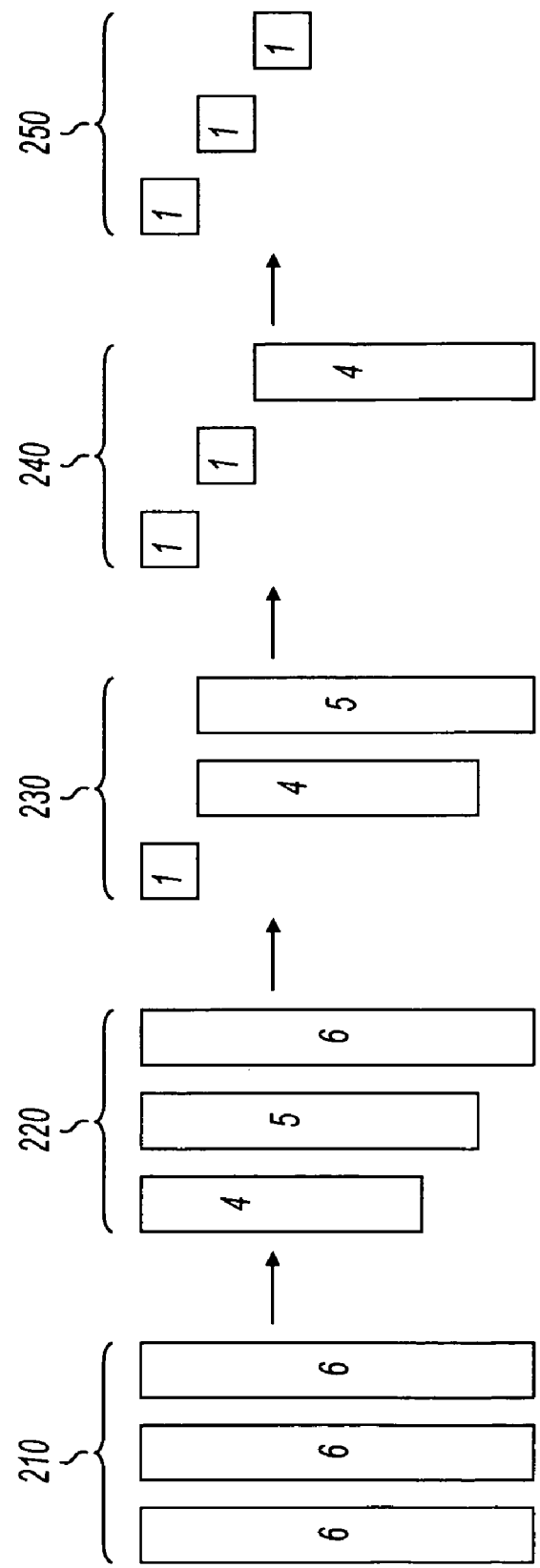
FIG. 2 shows recursive quantization of a beamforming matrix.

FIG. 2 shows recursive quantization of a beamforming matrix. The beamforming matrix of FIG. 2 undergoes the same operations as those shown in equation (9), above. The format of FIG. 2 accentuates the number of non-zero entries in each column of the matrix as the recursive quantization takes place. Beamforming matrix 210 includes three columns with six rows. This beamforming matrix corresponds to a transmitter with six antennas transmitting into three spatial channels. Using the nomenclature previously introduced, this corresponds to n=6 and k=3.

At 220, the beamforming matrix is transformed to have a lower left triangle of zeros. The leftmost column includes n−k+1 non-zero entries (four non-zero entries). The four non-zero entries form a column vector that is quantized. A Householder reflection is then performed as described above, and the dimensionality of the beamforming matrix is reduced by one in both the column and row dimensions.

At 230, the first column vector has been quantized, and a Householder reflection has been performed as described above. The center column now has n−k+1 non-zero entries. The center column is now quantized in the same manner as the first, and another Householder reflection is performed. The dimensionality of the beamforming matrix is reduced by in both dimensions, resulting in the configuration shown at 240. The last column vector now has n−k+1 entries. The column vector is quantized, resulting in the configuration shown at 250. The boxes shown with a "1" may be dropped.

The recursive quantization shown in FIG. 2 produces three codebook indices corresponding to the three quantized column vectors. The codebook indices are transmitted to another station, for reconstruction of the beamforming matrix. The three quantized column vectors each have n−k+1 entries, so the same codebook can be used to quantize the three vectors. In some embodiments, different codebooks have the same size vectors are used.

At the transmitter side, the reconstruction of the beamforming matrix V starts from the last quantized column vector and recursively constructs the whole matrix. In each step, a Householder matrix is computed from a reconstructed unit vector. If the global phases $\phi_i$ in equation (9) are not fed back, $\phi_i$ is set to zero in the reconstruction. Namely, $e^{j\phi_i}$ in equation (9) is replaced by 1 and the reconstruction runs from the right to left in equation (9) with the replaced 1s and quantized vectors. The Householder matrix can be computed and stored beforehand for small codebooks. If storage is limited, the codeword vectors can be converted and stored as $$\tilde{w}_j = \frac{u_j - e_1}{\|u_j - e_1\|},$$

in which $e_1=[1\ 0\ 0\ 0]^T$ and $u_j$ is the j-th codeword.

Then, computation of Householder matrix from $u_j$ is reduced to $Q(u_j)=I-2w_j w_j^H$ and no division is needed. Even in the case that there is no quantization error, the reconstructed matrix could be different from the original V by a global phase on each column and this is fine with closed loop MIMO.

Figure 3:
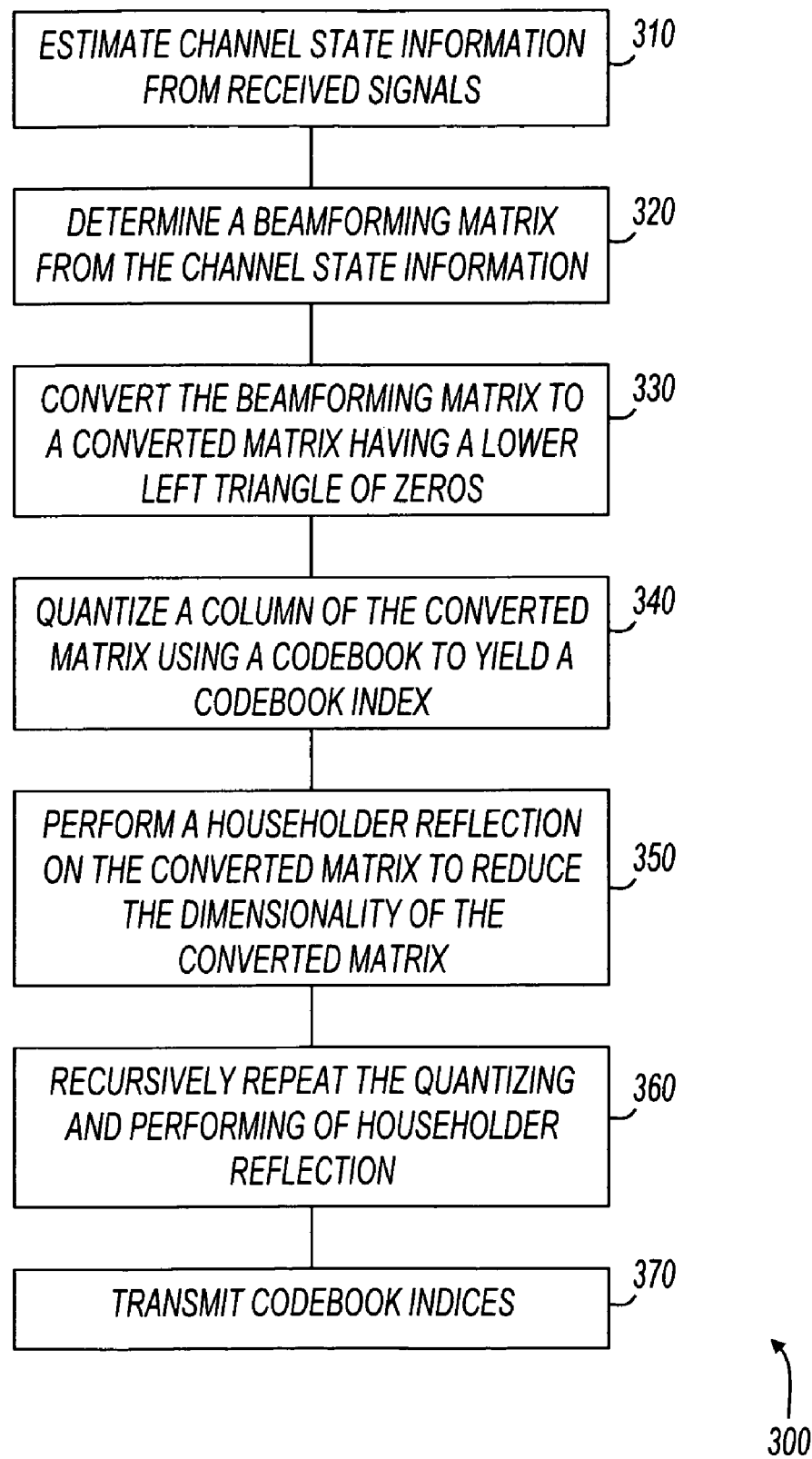
FIGS. 3 and 4 show flowcharts in accordance with various embodiments of the present invention.

FIG. 3 shows a flowchart in accordance with various embodiments of the present invention. In some embodiments, method 300 may be used in, or for, a wireless system that utilizes MIMO technology. In some embodiments, method 300, or portions thereof, is performed by a wireless communications device, embodiments of which are shown in the various figures. In other embodiments, method 300 is performed by a processor or electronic system. Method 300 is not limited by the particular type of apparatus or software element performing the method. The various actions in method 300 may be performed in the order presented, or may be performed in a different order. Further, in some embodiments, some actions listed in FIG. 3 are omitted from method 300.

Method 300 is shown beginning at block 310 in which channel state information is estimated from received signals. The channel state information may include the channel state matrix H described above. At 320, a beamforming matrix is determined from the channel state information. In some embodiments, this corresponds to performing singular value decomposition (SVD) as described above with reference to equation (1). The beamforming matrix V is also described above.

At 330, the beamforming matrix is converted to a matrix having a lower left triangle of zeros. This conversion can be done without changing the subspace by multiplying a unitary matrix on the right. In some embodiments, the unitary matrix can be a product of a series of Householder reflection (or Givens rotation) matrices.

At 340, a leftmost column of the converted beamforming matrix is quantized using a codebook. In various embodiments of the present invention, the actions of 340 correspond to searching a code block for an entry that most closely matches the column vector. For example, the operations described above with reference to equation (5) may be utilized to search a codebook. In various embodiments of the present invention, the size of the codebook, and therefore the number of bits used to represent the quantized vector, may vary. For example, in some embodiments, a large codebook may be used for all column vectors. Also for example, in some embodiments, a smaller codebook may be used for all column vectors. In some embodiments, different codebooks are used to quantize different column vectors.

The vector quantized at 340 has n−k+1 entries, in which n is the number of rows in the beamforming matrix, and k is the number of spatial channels. The operation at 330 ensures that the remaining (bottom-most) entries in the leftmost column are zero.

At 350, a householder reflection is performed on the converted beamforming matrix to reduce the dimensionality of the quantizing matrix. In some embodiments, the actions of 350 correspond to the operations described above with reference to the equations (6) and (7). After performing the Householder reflection, the leftmost column and the topmost row are all zeros except for a global phase value in the 1, 1 position, which can be discarded. The next column vector now has n−k+1 entries by virtue of the conversion performed at 330 and the leading zero in the top row.

At 360, the quantizing and householder reflection operations of 340 and 350 are recursively repeated. As the operations are recursively repeated, each of the column vectors may be quantized using the same codebook or different codebooks. For example, as the dimensionality of the quantizing matrix is reduced, each remaining leftmost column vector has n−k+1 entries. Because each column vector to be quantized is of the same dimensionality, the same codebook may be used for quantization of each vector.

The quantization of the vectors yields codebook indices that can be used by the transmitter to recreate (or approximate) the original beamforming matrix. At 370, the codebook indices are transmitted.

In some embodiments of method 300, quantizing and Householder reflection is recursively performed until a small matrix remains, and the small matrix is quantized using a codebook of small matrices. Also in some embodiments, large column vectors may be quantized by breaking the large column vectors into two or more sub-vectors, and then each of the sub-vectors may be quantized using one or more codebooks. The partition itself may be quantized using one or more codebooks.

Figure 4:
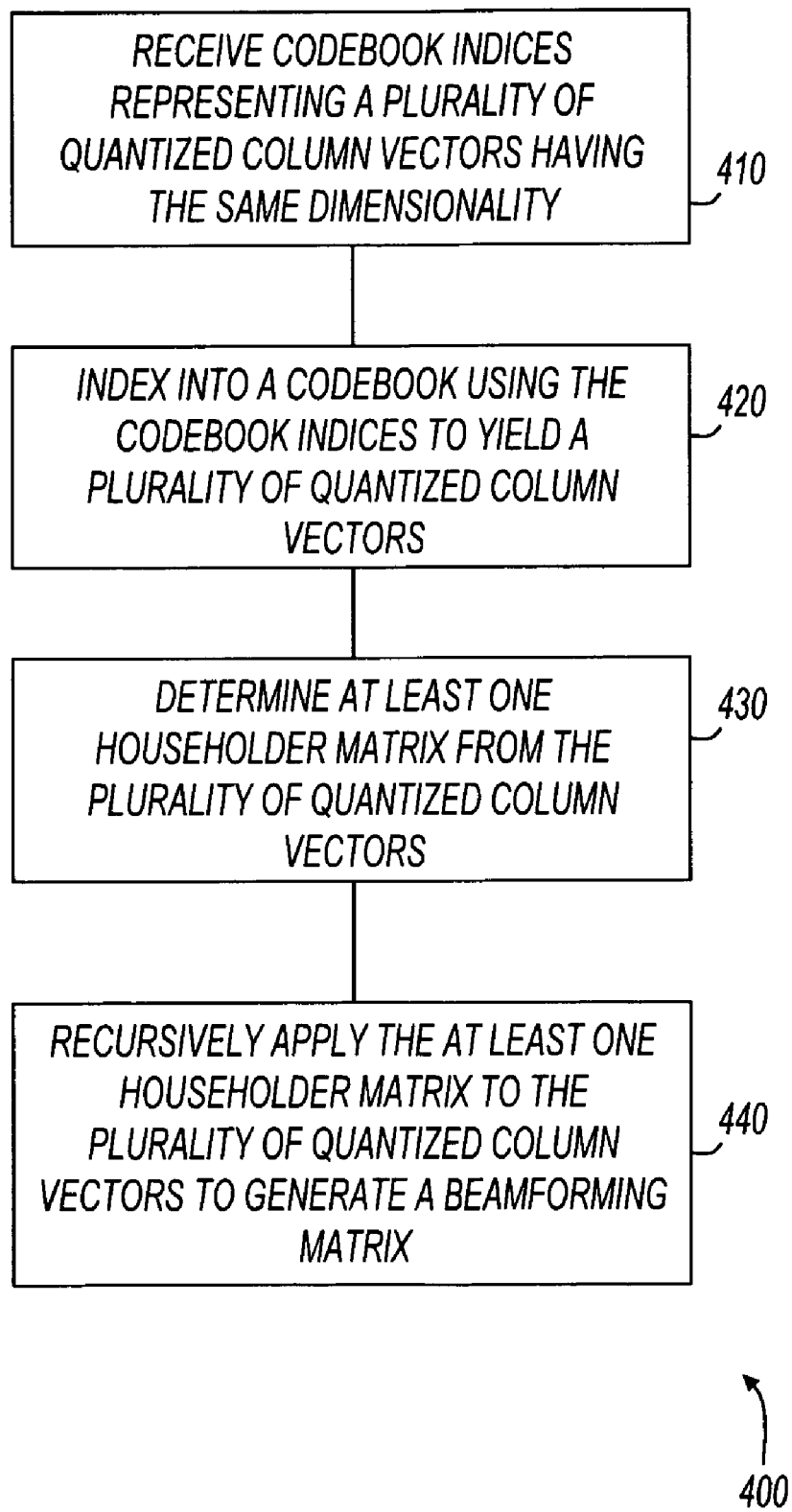

FIG. 4 shows a flowchart in accordance with various embodiments of the present invention. In some embodiments, method 400 may be used in, or for, a wireless system that utilizes MIMO technology. In some embodiments, method 400, or portions thereof, is performed by a wireless communications device, embodiments of which are shown in the various figures. In other embodiments, method 400 is performed by a processor or electronic system. Method 400 is not limited by the particular type of apparatus or software element performing the method. The various actions in method 400 may be performed in the order presented, or may be performed in a different order. Further, in some embodiments, some actions listed in FIG. 4 are omitted from method 400.

Method 400 is shown beginning at block 410 in which codebook indices representing quantized column vectors are received. The quantized column vectors represented by the codebook indices all have the same dimensionality (n−k+1). At 420, one or more codebooks are indexed into using the quantized column vectors to yield a plurality of quantized column vectors. The actions of 420 may take many different forms. For example, all of the quantized column vectors may be in one codebook or each of the quantized column vectors may be in different codebooks. Further, one or more column vectors may be represented as quantized sub-vectors, and each quantized sub-vector may be used to index into one or more codebooks, and a single column vector may be regenerated from multiple codebook entries.

At 430, at least one Householder matrix is determined from the plurality of column vectors. In some embodiments, this may correspond to performing operations such as those described above with reference to equation (6). In other embodiments, a table may be maintained with a one-to-one correspondence between quantized column vectors and Householder matrices. In these embodiments, a Householder matrix may be determined by indexing into a table using quantized column vector values.

At 440, the at least one Householder matrix is recursively applied to the plurality of quantized column vectors to generate a beamforming matrix. In some embodiments, the operations of 440 may correspond to reversing the actions described above with respect to equations (7) and (8). After the beamforming matrix is reproduced, the apparatus performing method 400 may utilize the beamforming matrix to operate on transmitted signals in a MIMO system.

The column-by-column quantization may result in a large performance loss for vector codebooks with small sizes. The joint quantization of the whole beamforming matrix is desirable in this case. A matrix codebook is first generated from the vector codebook(s) and then the matrix codebook is used to quantize the beamforming matrix according to some criterion e.g., maximizing beamformed channel capacity, maximizing beamformed channel mutual information, minimizing mean square error, etc., which are commonly used in the literature. The matrix codebook can be generated recursively from the vector codebook(s) using the reconstruction scheme in FIG. 4. The method adds columns from the right to the left. The codebook construction steps through each vector codeword in the vector codebook for each column. For example, the first matrix codeword of a 4 by 2 matrix codebook may be computed from the first vector codeword of a 3-vector codebook and the first vector codeword of the same or another 3-vector codebook using equation (9) in a reverse direction and replacing the $e^{j\phi_i}$ with 1. Similarly, the second matrix codeword of the 4 by 2 matrix codebook may be computed from the first vector codeword of a 3-vector codebook and the second vector codeword of the same or another 3-vector codebook.

In some embodiments, an upper triangle matrix of zeros instead of a lower triangle matrix can be generated by multiplying the quantizing matrix with a unitary matrix on the right similar to equation (4). The quantization can start from the rightmost column instead of the leftmost. Householder reflection can be used to zero all the entries except the last in the rightmost column. The zeroing can be recursively conducted from the right to the left. Similarly, the matrix codebook construction can using upper triangle zero matrix and adding columns from the left to the right. In general, since the columns of the beamforming matrix can be permuted by multiplying a unitary matrix on the right, the triangle of zeros can be permuted. For example, a 4 by 3 beamforming matrix $$V = \begin{bmatrix} \times & \times & \times \\ \times & \times & \times \\ & \times & \times \\ & & \times \end{bmatrix}$$

has a lower triangle of zeros.

$$V \begin{bmatrix} & & 1 \\ & 1 & \\ 1 & & \end{bmatrix} = \begin{bmatrix} \times & \times & \times \\ \times & \times & \times \\ \times & \times & \\ \times & & \end{bmatrix}$$

destroys the triangular shape. Therefore, any triangle of zeros or permuted triangle may be used in the quantization or codebook construction.

In some embodiments, many unitary matrixes other than Householder matrix can be used to zero the column entries. The only requirement of the unitary matrix is that the first row contains the conjugate of the vector being zeroed. For example, $Qv=e_1$, in which Q is the unitary matrix and v is the zeroing vector. Then, the first row of Q is $v^H$ and there are many choices for the other rows of Q, which span the same subspace orthogonal to v.

Figure 5:
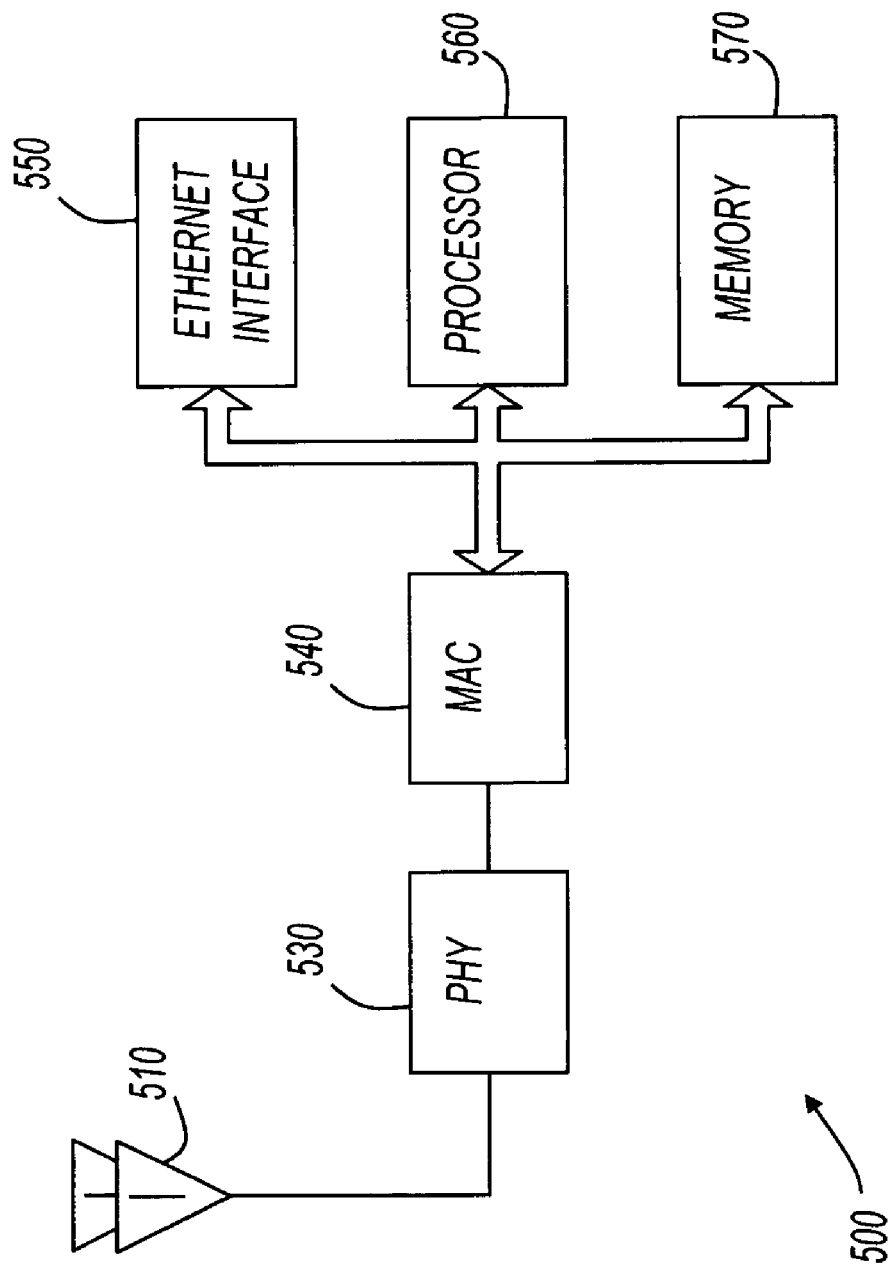
FIG. 5 shows an electronic system in accordance with various embodiments of the present invention.

FIG. 5 shows a system diagram in accordance with various embodiments of the present invention. Electronic system 500 includes antennas 510, physical layer (PHY) 530, media access control (MAC) layer 540, Ethernet interface 550, processor 560, and memory 570. In some embodiments, electronic system 500 may be a station capable of quantizing column vectors and performing Householder transformations as described above with reference to the previous figures. In other embodiments, electronic system 500 may be a station that receives quantized column vectors, and performs beamforming in a MIMO system. For example, electronic system 500 may be utilized in a wireless network as station 102 or station 104 (FIG. 1). Also for example, electronic system 500 may be a station capable of performing the calculations shown in any of the equations above.

In some embodiments, electronic system 500 may represent a system that includes an access point, a mobile station, a base station, or a subscriber unit as well as other circuits. For example, in some embodiments, electronic system 500 may be a computer, such as a personal computer, a workstation, or the like, that includes an access point or mobile station as a peripheral or as an integrated unit. Further, electronic system 500 may include a series of access points that are coupled together in a network.

In operation, system 500 sends and receives signals using antennas 510, and the signals are processed by the various elements shown in FIG. 5. Antennas 510 may be an antenna array or any type of antenna structure that supports MIMO processing. System 500 may operate in partial compliance with, or in complete compliance with, a wireless network standard such as an 802.11 or 802.16 standard.

Physical layer (PHY) 530 is coupled to antennas 510 to interact with a wireless network. PHY 530 may include circuitry to support the transmission and reception of radio frequency (RF) signals. For example, in some embodiments, PHY 530 includes an RF receiver to receive signals and perform "front end" processing such as low noise amplification (LNA), filtering, frequency conversion or the like. Further, in some embodiments, PHY 530 includes transform mechanisms and beamforming circuitry to support MIMO signal processing. Also for example, in some embodiments, PHY 530 includes circuits to support frequency up-conversion, and an RF transmitter.

Media access control (MAC) layer 540 may be any suitable media access control layer implementation. For example, MAC 540 may be implemented in software, or hardware or any combination thereof. In some embodiments, a portion of MAC 540 may be implemented in hardware, and a portion may be implemented in software that is executed by processor 560. Further, MAC 540 may include a processor separate from processor 560.

In operation, processor 560 reads instructions and data from memory 570 and performs actions in response thereto. For example, processor 560 may access instructions from memory 570 and perform method embodiments of the present invention, such as method 300 (FIG. 3) or method 400 (FIG. 4) or methods described with reference to other figures. Processor 560 represents any type of processor, including but not limited to, a microprocessor, a digital signal processor, a microcontroller, or the like.

Memory 570 represents an article that includes a machine readable medium. For example, memory 570 represents a random access memory (RAM), dynamic random access memory (DRAM), static random access memory (SRAM), read only memory (ROM), flash memory, or any other type of article that includes a medium readable by processor 560. Memory 570 may store instructions for performing the execution of the various method embodiments of the present invention. Memory 570 may also store beamforming matrices or beamforming vectors.

Although the various elements of system 500 are shown separate in FIG. 5, embodiments exist that combine the circuitry of processor 560, memory 570, Ethernet interface 550, and MAC 540 in a single integrated circuit. For example, memory 570 may be an internal memory within processor 560 or may be a microprogram control store within processor 560. In some embodiments, the various elements of system 500 may be separately packaged and mounted on a common circuit board. In other embodiments, the various elements are separate integrated circuit dice packaged together, such as in a multi-chip module, and in still further embodiments, various elements are on the same integrated circuit die.

Ethernet interface 550 may provide communications between electronic system 500 and other systems. For example, in some embodiments, electronic system 500 may be an access point that utilizes Ethernet interface 550 to communicate with a wired network or to communicate with other access points. Some embodiments of the present invention do not include Ethernet interface 550. For example, in some embodiments, electronic system 500 may be a network interface card (NIC) that communicates with a computer or network using a bus or other type of port.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method, comprising:
   receiving a plurality of codebook indices from a remote station having a plurality of antennas, the plurality of codebook indices representing a plurality of quantized column vectors of the same dimensionality, each quantized column vector corresponding to a column of a beamforming matrix, each column of the beamforming matrix being quantized by the remote station in an ordered sequence from a left-most column vector of the beamforming matrix to a right-most column vector of the beamforming matrix;
   determining a Householder matrix from a quantized column vector of the plurality of quantized column vectors corresponding to the right-most column vector of the beamforming matrix, the determining a Householder matrix comprising:
      indexing into a codebook using one of the plurality of codebook indices to yield a quantized column vector; and
      calculating the Householder matrix as a function of the quantized column vector; and
   recursively determining a Householder matrix for a next quantized column vector of the plurality of quantized column vectors to generate a beamforming matrix, the next quantized column vector for each recursive determination of the Householder matrix corresponding to a column vector of the beamforming matrix being immediately to the left of the column vector corresponding to the most recently determined Householder matrix.

2. The method of claim 1, wherein determining a Householder matrix further comprises indexing into a different codebook with each of the plurality of codebook indices.

3. The method of claim 1, wherein determining a Householder matrix further comprises indexing into the same codebook with each of the plurality of codebook indices.

4. The method of claim 1, wherein recursively determining yields a matrix with a lower left triangle of zeros.

5. An electronic system, comprising:
   N antennas;
   a processor coupled to the N antennas; and
   a physical radio interface (PHY) operable to receive a plurality of codebook indices representing a plurality of quantized column vectors of the same dimensionality, each quantized column vector corresponding to a column of a beamforming matrix, each column of the beamforming matrix being quantized by the remote station in an ordered sequence from a left-most column vector of the beamforming matrix to a right-most column vector of the beamforming matrix, the physical radio interface further operable to determine a Householder matrix from a quantized column vector of the plurality of quantized column vectors corresponding to the right-most column vector of the beamforming matrix, the determining a Householder matrix comprising indexing into a codebook using the plurality of codebook indices to yield the plurality of quantized column vectors, and calculating the Householder matrix as a function of the plurality of quantized column vectors, and operable to recursively determine a Householder matrix for a next quantized column vector of the plurality of quantized column vectors to generate a beamforming matrix, the next quantized column vector for each recursive determination of the Householder matrix corresponding to a column vector of the beamforming matrix being immediately to the left of the column vector corresponding to the most recently determined Householder matrix.

6. The electronic system of claim 5, wherein the dimensionality of the plurality of quantized column vectors is equal to n−k+1, wherein n is the number of rows in the beamforming matrix, and k is a number of spatial channels.

* * * * *